United States Patent
Natsuyama

(10) Patent No.: US 9,708,433 B2
(45) Date of Patent: Jul. 18, 2017

(54) METHOD FOR PRODUCING THERMOPLASTIC ELASTOMER COMPOSITION, AND METHOD FOR PRODUCING COMPOSITE ARTICLE

(71) Applicant: Sumitomo Chemical Company, Limited, Chuo-ku, Tokyo (JP)

(72) Inventor: Nobuhiro Natsuyama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 210 days.

(21) Appl. No.: 13/765,087

(22) Filed: Feb. 12, 2013

(65) Prior Publication Data

US 2013/0213548 A1 Aug. 22, 2013

(30) Foreign Application Priority Data

Feb. 16, 2012 (JP) ................................. 2012-031378

(51) Int. Cl.
| | | |
|---|---|---|
| *C08F 299/00* | (2006.01) | |
| *C08L 23/08* | (2006.01) | |
| *C08L 23/16* | (2006.01) | |
| *C08K 5/14* | (2006.01) | |

(52) U.S. Cl.
CPC ............ *C08F 299/00* (2013.01); *C08L 23/08* (2013.01); *C08L 23/0869* (2013.01); *C08K 5/14* (2013.01); *C08L 23/16* (2013.01); *C08L 2312/00* (2013.01); *C08L 2666/06* (2013.01); *Y10T 156/10* (2015.01)

(58) Field of Classification Search
CPC .............................. C08L 23/16; C08L 2666/06
USPC ....................................................... 156/308.2
See application file for complete search history.

(56) References Cited

U.S. PATENT DOCUMENTS

| 4,058,647 | A | * | 11/1977 | Inoue et al. ................ 428/476.1 |
| 2006/0073351 | A1 | * | 4/2006 | Natsuyama et al. .......... 428/521 |

FOREIGN PATENT DOCUMENTS

| JP | 02-097542 A | 4/1990 |
| JP | 07-016989 A | 1/1995 |

* cited by examiner

*Primary Examiner* — Carson Gross
(74) *Attorney, Agent, or Firm* — Panitch Schwarze Belisario & Nadel LLP

(57) ABSTRACT

A method for producing a thermoplastic elastomer composition includes: (1) a step of dynamically vulcanizing 50 to 90% by weight of (A) an oil-extended ethylene-α-olefin-based copolymerized rubber and 10 to 50% by weight of (B) a propylene-based resin, where the total amount of the oil-extended ethylene-α-olefin-based copolymerized rubber (A) and the propylene-based resin (B) is taken as 100% by weight, in the presence of a crosslinking agent, thereby obtaining a thermoplastic elastomer, wherein the oil-extended ethylene-α-olefin-based copolymerized rubber (A) contains 100 parts by weight of an ethylene-α-olefin-based copolymer rubber having a Mooney viscosity ($ML_{1+4}100°$ C.) of 150 to 350 at 100° C. and 20 to 150 parts by weight of a mineral oil-based softening agent, and (2) a step of kneading 100 parts by weight of the thermoplastic elastomer and 15 to 120 parts by weight of (C) an ethylene-based copolymer containing unsaturated carboxylic acid units, thereby obtaining the thermoplastic elastomer composition.

6 Claims, No Drawings

METHOD FOR PRODUCING THERMOPLASTIC ELASTOMER COMPOSITION, AND METHOD FOR PRODUCING COMPOSITE ARTICLE

TECHNICAL FIELD

The present invention relates to a method for producing a thermoplastic elastomer composition and a method for producing a composite article.

BACKGROUND ART

Olefin-based thermoplastic elastomers obtained by vulcanizing an olefin copolymer rubber with a crosslinking agent while kneading the rubber with an olefin-based resin have been used widely for molding automotive parts and the like. In order to impart cushion property to the surface of an article made of a thermoplastic resin such as a polyamide resin, thermally welding of an olefin-based thermoplastic elastomer to the article has recently been attempted. However, there was a problem that olefin-based resins which are constituents of olefin-based thermoplastic elastomers are difficult to adhere thermally to thermoplastic resins having polar groups such as polyamide because of the nonpolarity of the olefin-based resins.

Patent document 1 has disclosed a method for producing a laminate, the method comprising laminating a layer of a polymer composition comprising a polypropylene-based resin and a hydrogenated diene-based copolymer obtained by hydrogenating a block copolymer formed by polymerizing a conjugated diene and an aromatic vinyl compound as main components and a layer of a thermoplastic polyamide elastomer via a functional group-containing polyolefin adhesive layer. However, this method needs a step of providing an adhesive layer.

PRIOR ART DOCUMENTS

Patent Document

[Patent Document 1] JP 7-16989 A

SUMMARY OF THE INVENTION

Problems to be Solved by the Invention

In view of such current situations, the problem to be solved by the present invention is to provide a method for producing a composite article which is composed of an article of a thermoplastic elastomer composition and an article of a polyamide resin welded together with sufficient strength, and of which the part is formed by the article of the thermoplastic elastomer composition being superior in appearance and cushion property, and a method for producing a thermoplastic elastomer composition capable of affording such a composite article.

Means for Solving the Problems

A first aspect of the present invention relates to a method for producing a thermoplastic elastomer composition, the method comprising a step of dynamically vulcanizing 50 to 90% by weight of (A) an oil-extended ethylene-α-olefin-based copolymerized rubber and 10 to 50% by weight of (B) a propylene-based resin, where the total amount of the oil-extended ethylene-α-olefin-based copolymerized rubber (A) and the propylene-based resin (B) is taken as 100% by weight, in the presence of a crosslinking agent, thereby obtaining a thermoplastic elastomer, wherein the oil-extended ethylene-α-olefin-based copolymerized rubber (A) comprises 100 parts by weight of an ethylene-α-olefin-based copolymer rubber having a Mooney viscosity ($ML_{1+4}100°$ C.) of 150 to 350 at 100° C. and 20 to 150 parts by weight of a mineral oil-based softening agent, and a step of kneading 100 parts by weight of the thermoplastic elastomer and 15 to 120 parts by weight of (C) an ethylene-based copolymer comprising unsaturated carboxylic acid units, thereby obtaining the thermoplastic elastomer composition.

A second aspect of the present invention is a method for producing a composite article, the method comprising a step of welding an article made of a polyamide resin and an article made of a thermoplastic elastomer composition together, wherein the thermoplastic elastomer composition is obtained by the above-described method.

Advantageous Effects of the Invention

According to the present invention, it is possible to obtain a composite article which is composed of an article of a thermoplastic elastomer composition and an article of a polyamide resin welded together with sufficient strength without an adhesive layer between the article of the thermoplastic elastomer composition and the article of the polyamide resin, and of which the part is formed by the article of the thermoplastic elastomer composition being superior in appearance and cushion property.

MODE FOR CARRYING OUT THE INVENTION

<Oil-Extended Ethylene-α-Olefin-Based Copolymerized Rubber (A)>

The oil-extended ethylene-α-olefin-based copolymerized rubber (A) comprises an ethylene-α-olefin-based copolymerized rubber and a mineral oil-based softening agent.

The ethylene-α-olefin-based copolymerized rubber contained in the oil-extended ethylene-α-olefin-based copolymerized rubber (A) is a copolymer rubber comprising ethylene units and α-olefin units and having an A hardness of JIS K6253 of 85 or less. Hereinafter, the term "monomer's name+unit" such as "ethylene unit" used in the present invention means a constitutional unit derived from the monomer present in a rubber or resin obtained by polymerizing the monomer.

The α-olefin is preferably an α-olefin having 3 to 20 carbon atoms, and examples thereof include propylene, 1-butene, 2-methylpropylene, 1-pentene, 3-methyl-1-butene, 1-hexene, 4-methyl-1-pentene, and 1-octene. Two or more α-olefins may be used. α-Olefins having 3 to 6 carbon atoms are preferred because of their ready availability; propylene or 1-butene is more preferred and propylene is even more preferred.

The ethylene-α-olefin-based copolymerized rubber may have other monomer units in addition to the ethylene units and the α-olefin units. Examples of the other monomer to afford such other monomer units include conjugated dienes having 4 to 8 carbon atoms such as 1,3-butadiene, 2-methyl-1,3-butadiene (namely, isoprene), 1,3-pentadiene, and 2,3-dimethyl-1,3-butadiene; non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl ester compounds such as vinyl acetate; unsaturated carboxylic acid esters such as methyl acrylate, ethyl acrylate, butyl acrylate, methyl methacrylate, and ethyl methacrylate; and unsaturated carboxylic acids such as acrylic acid and methacrylic acid. Two or more other monomers may be used. Preferably, the ethylene-α-olefin-based copolymerized rubber comprises other monomer units. Preferably, the other monomer to afford such other monomer units is 5-ethylidene-2-norbornene or dicyclopentadiene.

The content of the ethylene units in the ethylene-α-olefin-based copolymerized rubber is usually 30 to 85% by weight, preferably 40 to 80% by weight, the content of the α-olefin units in the ethylene-α-olefin-based copolymerized rubber is usually 15 to 70% by weight, preferably 20 to 60% by weight, and the content of the other monomer units other than the ethylene units and the α-olefin units in the ethylene-α-olefin-based copolymerized rubber is usually 0 to 30% by weight, preferably 0 to 20% by weight (the sum total of the monomer units constituting the ethylene-α-olefin-based copolymerized rubber is taken as 100% by weight).

Examples of the ethylene-α-olefin-based copolymerized rubber include ethylene-propylene copolymerized rubbers, ethylene-1-butene copolymerized rubbers, ethylene-1-hexene copolymerized rubbers, ethylene-1-octene copolymerized rubbers, ethylene-propylene-1-butene copolymerized rubbers, ethylene-propylene-1-hexene copolymerized rubbers, ethylene-propylene-1-octene copolymerized rubbers, ethylene-propylene-5-ethylidene-2-norbornene copolymerized rubbers, ethylene-propylene-dicyclopentadiene copolymerized rubbers, ethylene-propylene-1,4-hexadiene copolymerized rubbers, and ethylene-propylene-5-vinyl-2-norbornene copolymerized rubbers. Two or more rubbers may be used. Especially, an ethylene-propylene copolymerized rubber or an ethylene-propylene-5-ethylidene-2-norbornene copolymerized rubber is preferred, and an ethylene-propylene copolymerized rubber or an ethylene-propylene-5-ethylidene-2-norbornene copolymerized rubber comprising an ethylene unit content of 40 to 80% byweight, a propylene unit content of 15 to 60% byweight, and a 5-ethylidene-2-norbornene unit content of 0 to 20% by weight is more preferred.

The Mooney viscosity ($ML_{1+4}100°$ C.) of the ethylene-α-olefin-based copolymerized rubber is 150 to 350, preferably 200 to 300. A thermoplastic elastomer composition obtained using an ethylene-α-olefin-based copolymerized rubber having a Mooney viscosity falling within the above-mentioned range is superior in mechanical strength and can afford articles with good appearance. "Mooney viscosity ($ML_{1+4}100°$ C.)" is a viscosity measured in accordance with ASTM D1646. ($ML_{1+4}100°$ C.) has the following meaning:
M: Mooney viscosity,
L: a large rotor was used,
100° C.: measurement temperature,
1+4: a value measured when a rotor was rotated at 2 rpm for 4 minutes after the sample was heated for 1 minute.

The Mooney viscosity ($ML_{1+4}100°$ C.) of an ethylene-α-olefin-based copolymerized rubber can be measured in accordance with ASTM D1646. The Mooney viscosity ($ML_{1+4}100°$ C.) of an ethylene-α-olefin-based copolymerized rubber can also be measured using the formula given below from the Mooney viscosity ($ML_{1+4}100°$ C.) of an oil-extended ethylene-α-olefin-based copolymerized rubber obtained using the ethylene-α-olefin-based copolymerized rubber and a mineral oil-based softening agent and the amount of the mineral oil-based softening agent used, $$\log(ML1/ML2)=0.0066\times(\Delta PHR)$$

ML1: the Mooney viscosity of the ethylene-α-olefin-based copolymerized rubber,
ML2: the Mooney viscosity of the oil-extended ethylene-α-olefin-based copolymerized rubber,
ΔPHR: the amount of the mineral oil-based softening agent per 100 parts by weight of the ethylene-α-olefin-based copolymerized rubber.

In order to enhance the mechanical strength of an article, the intrinsic viscosity of the ethylene-α-olefin-based copolymerized rubber measured at 135° C. in tetralin is preferably 1.5 dl/g or more, more preferably 2 dl/g or more. In order to improve the appearance of an article, the intrinsic viscosity is preferably 8 dl/g or less, more preferably 6 dl/g or less.

The ethylene-α-olefin-based copolymerized rubber can be obtained by performing polymerization by a conventional method. Examples of the polymerization method include a method in which monomers are polymerized in an inert solvent such as hexane, heptane, toluene and xylene using a polymerization catalyst such as a Ziegler-Natta catalyst or a metallocene catalyst.

Examples of the mineral oil-based softening agent contained in the oil-extended ethylene-α-olefin-based copolymerized rubber (A) include high boiling fractions (having an average molecular weight of 300 to 1500 and a flow point of 0° C. or lower) of petroleum, such as aromatic mineral oil, naphthenic mineral oil, and paraffinic mineral oil. Especially, paraffinic mineral oil is preferred.

The mineral oil-based softening agent is used by adding it as an extender oil to the ethylene-α-olefin-based copolymerized rubber. Examples of the method of mixing the mineral oil-based softening agent and the ethylene-α-olefin-based copolymerized rubber include (1) a method comprising mechanically kneading the mineral oil-based softening agent and the ethylene-α-olefin-based copolymerized rubber by using a kneading apparatus such as a roll or a Banbury mixer, and (2) a method comprising producing the ethylene-α-olefin-based copolymerized rubber in a solvent, then adding the mineral oil-based softening agent to the solvent, and subsequently removing the solvent by such a method as steam stripping.

The oil-extended ethylene-α-olefin-based copolymerized rubber (A) comprises 100 parts by weight of the ethylene-α-olefin-based copolymerized rubber and 20 to 150 parts by weight of the mineral oil-based softening agent. The content of the mineral oil-based softening agent is preferably 40 to 120 parts by weight.

<Propylene-Based Resin (B)>

The propylene-based resin (B) in the present invention is a resin comprising 50 to 100% by weight, preferably 80 to 100% by weight, of monomer units based on propylene (i.e., propylene units), where the amount of the propylene-based resin (B) is taken as 100% byweight. Examples of the propylene-based resin include propylene homopolymers, and copolymers of propylene with at least one comonomer selected from the comonomer group consisting of ethylene and α-olefins having 4 to 10 carbon atoms (e.g., 1-butene, 1-hexene, 1-pentene, 1-octene, and 4-methyl-1-pentene). Such copolymers may be either random copolymers or block copolymers. More specific examples of such copolymers include propylene-ethylene copolymers, propylene-1-butene copolymers, propylene-1-hexene copolymers, propylene-1-octene copolymers, propylene-ethylene-1-butene copolymers, and ethylene-propylene-1-hexene copolymers. Preferred as the propylene-based resin are propylene homopolymers, propylene-ethylene copolymers, and propylene-1-butene copolymers.

Examples of the structural configuration of the propylene-based resin (B) include isotactic structure, syndiotactic structure, and structure in which the preceding structures are mixed. Preferably, the main structure is isotactic structure.

The melt flow rate (measured under a load of 21.18 N at a temperature of 230° C. in accordance with JIS K7210) of the propylene-based resin (B) is preferably 0.1 to 300 g/10 minutes, more preferably 0.5 to 200 g/10 minutes.

The propylene-based resin (B) can be produced by conventional polymerization methods using a Ziegler-Natta catalyst, a metallocene catalyst, or the like as a polymerization catalyst. Examples of the polymerization method include a solution polymerization method, a bulk polymerization method, a slurry polymerization method, and a gas phase polymerization method; these may be used in combination.

<Thermoplastic Elastomer>

A thermoplastic elastomer is obtained by dynamically vulcanizing 50 to 90% by weight of the oil-extended ethylene-α-olefin-based copolymerized rubber (A) and 10 to 50% by weight of the propylene-based resin (B) in the presence of a crosslinking agent, where the total amount of the oil-extended ethylene-α-olefin-based copolymerized rubber and the propylene-based resin is taken as 100% by weight.

The amount of the oil-extended ethylene-α-olefin-based copolymerized rubber (A) is preferably 40 to 89% by weight, more preferably 60 to 87% by weight.

The amount of the propylene-based resin (B) is preferably 11 to 60% by weight, more preferably 13 to 40% by weight.

If the amount of the propylene-based resin (B) is excessively small, the flowability of the resulting thermoplastic elastomer tends to become lower and thereby cause defective molding or defective appearance, whereas if that amount is excessively large, the thermoplastic elastomer tends to fail to exhibit elasticity.

As the crosslinking agent to be used in the present invention, a crosslinking agent usually used for crosslinking rubber can be used. Examples of the crosslinking agent include organic peroxides, phenol resin, sulfur, sulfur-containing compounds, p-quinone, derivatives of p-quinonedioxime, bismaleimide compounds, epoxy compounds, silane compounds, and amino resins. Especially, organic peroxides are preferred.

Examples of the organic peroxide include dicumyl peroxide, di-tert-butyl peroxide, 2,5-dimethyl-2,5-di-(tert-butylperoxy)hexane, 2,5-dimethyl-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, and tert-butyl peroxide. Preferred are 2,5-dimethyl-2,5-di(tert-butylperoxy)-hexyne-3, 2,5-dimethyl-2,5-di-(tert-butylperoxy) hexane, and 1,3-bis(tert-butylperoxyisopropyl)benzene; more preferred is 2,5-dimethyl-2,5-di(tert-butylperoxy)-hexyne-3.

Such organic peroxides may be in any form including liquid, powder, and pellet. Organic peroxides may be diluted with a diluent, such as an inorganic filler, a mineral oil, and a solvent which are inert to a crosslinking reaction. In order to increase the dispersibility of an organic peroxide in a crosslinking reaction, it is preferred to add the organic peroxide in a liquid state, and it is more preferred to add the organic peroxide diluted with a paraffinic oil.

In order to make the crosslinking reaction proceed uniformly and gently, the organic peroxide may be used in combination with a crosslinking aid.

Examples of the crosslinking aid include sulfur, p-quinonedioxime, p,p'-dibenzoylquinonedioxime, ethylene glycol dimethacrylate, diethylene glycol dimethacrylate, triethylene glycol dimethacrylate, tetraethylene glycol dimethacrylate, polyethylene glycol dimethacrylate, trimethylolpropane trimethacrylate, diallyl phthalate, tetraallyloxyethane, triallyl isocyanurate, N,N'-m-phenylenebismaleimide, maleic anhydride, divinylbenzene, zinc diacrylate, and zinc dimethacrylate. Especially, N,N'-m-phenylenebismaleimide, p,p'-dibenzoylquinonedioxime, divinylbenzene, trimethylolpropane trimethacrylate, or triallyl isocyanurate is preferred. N,N'-m-phenylenebismaleimide can also be used alone as a crosslinking agent.

Examples of the phenol resin to be used as a crosslinking agent include compounds represented by the following formula generally used as a crosslinking agent for rubber (see U.S. Pat. Nos. 3,287,440 and 3,709,840):

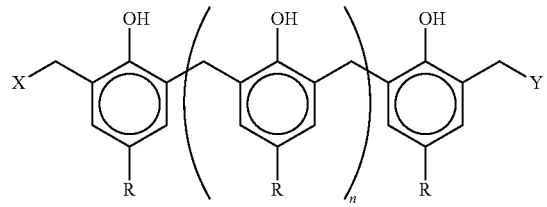

wherein n represents an integer of 0 to 10, X and Y each independently represent a hydroxyl group, a halogenated alkyl group, or a halogen atom; and R represents a saturated hydrocarbon group having 1 to 15 carbon atoms. The compound can be produced by making a substituted phenol and an aldehyde undergo condensation polymerization with an alkaline catalyst.

Examples of the phenol resin also include alkylphenol formaldehyde and brominated alkylphenol formaldehyde.

In the case of using a phenol resin as a crosslinking agent, it may be used in combination with a crosslinking accelerator in order to control the rate of the crosslinking reaction. Examples of the crosslinking accelerator include metal halides such as stannous chloride and ferric chloride; and organic halides such as chlorinated polypropylene, brominated butyl rubber, and chloroprene rubber.

The phenol resin is preferably used in combination with a dispersing agent such as metal oxides (e.g., zinc oxide) and stearic acid.

The amount of the crosslinking agent is preferably 0.01 to 10 parts by weight, more preferably 0.05 to 5 parts by weight, and even more preferably 0.1 to 3 parts by weight where the total amount of the oil-extended ethylene-α-olefin-based copolymerized rubber (A) and the propylene-based resin (B) is taken as 100 parts by weight.

The amount of the crosslinking aid is preferably 0.01 to 5 parts by weight, more preferably 0.05 to 3 parts by weight, and even more preferably 0.1 to 1 part by weight where the total amount of the oil-extended ethylene-α-olefin-based copolymerized rubber (A) and the propylene-based resin (B) is taken as 100 parts by weight.

Dynamic vulcanization means a treatment to crosslink an oil-extended ethylene-α-olefin-based copolymerized rubber (A) by melt-kneading the oil-extended ethylene-α-olefin-based copolymerized rubber (A) and a propylene-based resin (B) in the presence of a crosslinking agent under the addition of shearing force. For dynamic vulcanization, there can be used conventional apparatus, such as a mixing roll, which are of open type, and a Banbury mixer, a kneader, a single screw extruder, and a twin screw extruder, which are of closed type, can be used. Although a plurality of apparatus may be combined, a twin screw extruder is preferably used especially in respect of productivity. The temperature of dynamic vulcanization is usually 150 to 300° C., preferably 170 to 280° C. The time of dynamic vulcanization is usually 0.5 to 30 minutes, preferably 1 to 20 minutes.

<Ethylene-Based Copolymer (C) Comprising Unsaturated Carboxylic Acid Units>

A thermoplastic elastomer composition is obtained by kneading the above-described thermoplastic elastomer and (C) an ethylene-based copolymer comprising unsaturated carboxylic acid units.

The ethylene-based copolymer (C) comprising unsaturated carboxylic acid units in the present invention comprises ethylene units and unsaturated carboxylic acid units. Preferably, the ethylene-based copolymer (C) comprises ethylene units, unsaturated carboxylic acid units, and unsaturated ester compound units. Preferably, the unsaturated carboxylic acid units are constitutional units derived from an unsaturated dicarboxylic acid anhydride.

Preferably, the ethylene-based copolymer (C) comprises 55 to 96% by weight of ethylene units, 3 to 37% by weight of unsaturated ester compound units, and 1 to 8% by weight of unsaturated dicarboxylic acid anhydride units where the weight of the ethylene-based copolymer (C) is taken as 100% by weight.

Preferably, the monomer that affords the unsaturated ester compound units contained in the ethylene-based copolymer (C) is selected from among alkyl acrylates and alkyl methacrylates having an alkyl group having 1 to 8 carbon atoms. Examples of the monomer include methyl acrylate, ethyl acrylate, butyl acrylate, methyl methacrylate, ethyl methacrylate, 2-ethylhexyl methacrylate, and butyl methacrylate. More preferred are alkyl acrylates having 1 to 6 carbon atoms.

In view of the compatibility of the ethylene-based copolymer (C) with a thermoplastic elastomer and the mechanical properties of an article of a thermoplastic elastomer composition obtained using the ethylene-based copolymer (C), the amount of the unsaturated ester compound units contained in the ethylene-based copolymer (C) is more preferably within the range of 5 to 30% by weight, even more preferably 10 to 20% by weight where the weight of the ethylene-based copolymer (C) is taken as 100% by weight.

Examples of the monomer to afford the unsaturated carboxylic acid units include unsaturated dicarboxylic acid anhydrides, such as maleic anhydride, citraconic anhydride, itaconic anhydride, and tetrahydrophthalic anhydride; out of these, maleic anhydride is most preferred. Preferably, the unsaturated carboxylic acid units are maleic anhydride units.

In view of the adhesion between an article of a thermoplastic elastomer composition obtained using the ethylene-based copolymer (C) and an article of a polyamide and the compatibility of the ethylene-based copolymer (C) with a thermoplastic elastomer, the amount of the unsaturated carboxylic acid units is more preferably within the range of 1.5 to 6% by weight, even more preferably 2 to 5% by weight where the weight of the ethylene-based copolymer (C) is taken as 100% by weight.

There are no limitations with the method for producing the ethylene-based copolymer (C), and conventional methods, such as a solution polymerization method, an emulsion polymerization method, and a high pressure bulk polymerization method, are applied. Especially, the most common is a high pressure polymerization method by which monomers are polymerized in the presence of a radical generator at 500 to 3000 atm, 100 to 300° C. in the presence or absence of a proper solvent or a proper chain transfer agent. Such a high pressure polymerization method is suitably a method in which a solution prepared by dissolving ethylene and the above-described unsaturated dicarboxylic acid anhydride in the above-described unsaturated ester compound is pressurized with a high pressure pump, directly conveyed and introduced into a tub-like or a tubular reactor, and then subjected to polymerization under high pressure. The melt flow rate (measured at 190° C., 21.18 N in accordance with JIS K6758) of the ethylene-based copolymer (C) is preferably 0.5 to 300 g/10 minutes, more preferably 1 to 200 g/10 minutes.

When the melt flow rate of an ethylene-based copolymer (C) is excessively low, the ethylene-based copolymer (C) lacks in miscibility with a thermoplastic elastomer, whereas when the melt flow rate is excessively high, the heat resistance of a thermoplastic elastomer composition to be obtained using the ethylene-based copolymer (C) becomes lower.

<Thermoplastic Elastomer Composition>

A thermoplastic elastomer composition is obtained by kneading 100 parts by weight of the thermoplastic elastomer and 15 to 120 parts by weight of the ethylene-based copolymer (C) comprising unsaturated carboxylic acid units.

The amount of the ethylene-based copolymer (C) is 15 to 120 parts by weight, preferably 25 to 80 parts by weight, more preferably 40 to 50 parts by weight per 100 parts by weight of the thermoplastic elastomer.

If the amount of the ethylene-based copolymer (C) is excessively small, the adhesiveness between an article made of a thermoplastic elastomer composition obtained using the ethylene-based copolymer (C) and an article made of a polyamide resin tends to deteriorate, whereas if that amount is excessively large, the article made of the thermoplastic elastomer composition tends to deteriorate in flexibility and compression set.

Examples of the method for producing the thermoplastic elastomer composition of the present invention include the following methods:

(1) a method in which the oil-extended ethylene-α-olefin-based copolymerized rubber (A) and the propylene-based resin (B) are dynamically vulcanized in the presence of a crosslinking agent with a mixing roll, which is of open type, a Banbury mixer, a kneader, an extruder, or a twin screw extruder, which are of closed type, affording a thermoplastic elastomer, and then the thermoplastic elastomer and the ethylene-based copolymer (C) are melt-kneaded with a conventional melt-kneading machine, such as a mixing roll, which is of open type, and a Banbury mixer, a kneader, an extruder, and a twin screw extruder, which are of closed type, (2) a method in which an extruder having a plurality of feedstock inlets is used, the oil-extended ethylene-α-olefin-based copolymerized rubber (A) and the propylene-based resin (B) are dynamically vulcanized in the presence of a crosslinking agent at the upstream side of the extruder to form a thermoplastic elastomer, then the ethylene-based copolymer (C) is fed through an inlet provided on the downstream side of the extruder, and the thermoplastic elastomer produced at the upstream side of the extruder and the ethylene-based copolymer (C) are melt-kneaded at the downstream side of the extruder, (3) a method in which the oil-extended ethylene-α-olefin-based copolymerized rubber (A) and the propylene-based resin (B) are dynamically vulcanized in the presence of a crosslinking agent with a mixing roll, which is of open type, or a Banbury mixer, a kneader, an extruder, or a twin screw extruder, which are of closed type, to afford a thermoplastic elastomer, and then the thermoplastic elastomer and the ethylene-based copolymer (C) are melt-kneaded with a conventional molding machine, such as an extruder and an injection molding machine, to form an article of a thermoplastic elastomer composition.

The temperature at which the thermoplastic elastomer and the ethylene-based copolymer (C) are melt-kneaded is usually 150 to 250° C. The time for which the thermoplastic elastomer and the ethylene-based copolymer (C) are melt-kneaded is usually 10 seconds to 30 minutes.

Additives, such as a filler, a UV absorber, a light stabilizer, an anti-aging agent, a release agent, and a pigment, can be incorporated into the thermoplastic elastomer composition when necessary as long as the objective of the present invention is not disturbed.

Examples of the filler include carbon black, clay, talc, calcium carbonate, kaolin, diatomaceous earth, silica, alumina, graphite, and glass fiber. Examples of the release agent include fatty acid amides, silicone oil, glycerol, and wax.

<Polyamide Resin>

Polyamide resin is a polymer having amide bonds in the main chain thereof. Main raw materials of the polyamide resin include aminocarboxylic acid, lactam, or diamine and dicarboxylic acid (including a pair of the salts).

Specific examples of the raw materials include aminocarboxylic acids such as 6-aminocaproic acid, 11-aminoundecanoic acid, 12-aminododecanoic acid, and para-aminomethylbenzoic acid; lactams such as ε-caprolactam, ω-undecanolactam, and ω-laurolactam; diamines such as tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, meta-xylylenediamine, para-xylylenediamine, 1,3-bis(aminomethyl)cyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and dicarboxylic acids such as adipic acid, suberic acid, azelaic acid, sebacic acid, dodecanedicarboxylic acid, terephthalic acid, isophthalic acid, 2-chloroterephthalic acid, 2-methylterephthalic acid, 5-methylisophthalic acid, sodium 5-sulfoisophthalic acid, hexahydroterephthalic acid, and hexahydroisophthalic acid. The above-mentioned diamines and dicarboxylic acids may be used as a pair of salt.

Preferable examples of such a polyamide resin include polycaproamide (nylon 6), polytetramethylene adipamide (nylon 46), polyhexamethylene adipamide (nylon 66), polycaproamide/polyhexamethylene adipamide copolymer (nylon 6/66), polyundecamide (nylon 11), polycaproamide/polyundecamide copolymer (nylon 6/11), polydodecamide (nylon 12), polycaproamide/polydodecamide copolymer (nylon 6/12), polyhexamethylene sebacamide (nylon 610), polyhexamethylene dodecamide (nylon 612), polyundecamethylene adipamide (nylon 116), polyhexamethylene isophthalamide (nylon 6I), polyhexamethylene terephthalamide (nylon 6T), polyhexamethylene terephthalamide/polyhexamethylene isophthalamide copolymer (nylon 6T/6I), polycaproamide/polyhexamethylene terephthalamide copolymer (nylon 6/6T), polycaproamide/polyhexamethylene isophthalamide copolymer (nylon 6/6I), polyhexamethylene adipamide/polyhexamethylene terephthalamide copolymer (nylon 66/6T), polyhexamethylene adipamide/polyhexamethylene isophthalamide copolymer (nylon 66/6I), polytrimethylhexamethylene terephthalamide (nylon TMDT), polybis(4-aminocyclohexyl)methane dodecamide (nylon PACM12), polybis(3-methyl-4-aminocyclohexyl)methane dodecamide (nylon dimethyl PACM12), polymeta-xylylene adipamide (nylon MXD6), and polyundecamethylene terephthalamide (nylon 11T). Especially, nylon 6 and nylon 66 are particularly preferable from their superior balance between mechanical strength and thermal stability, and their superior economical efficiency.

<Composite Article>

The method for producing a composite article of the present invention is a method comprising the step of welding an article of a polyamide resin and an article of a thermoplastic elastomer composition together, wherein the thermoplastic elastomer composition is produced by the following method: a method comprising a step of dynamically vulcanizing 50 to 90% by weight of (A) an oil-extended ethylene-α-olefin-based copolymerized rubber and 10 to 50% by weight of (B) a propylene-based resin, where the total amount of the oil-extended ethylene-α-olefin-based copolymerized rubber (A) and the propylene-based resin (B) is taken as 100% by weight, in the presence of a crosslinking agent, thereby obtaining a thermoplastic elastomer, wherein the oil-extended ethylene-α-olefin-based copolymerized rubber (A) comprises 100 parts by weight of an ethylene-α-olefin-based copolymer rubber having a Mooney viscosity ($ML_{1+4}100°$ C.) of 150 to 350 at 100° C. and 20 to 150 parts by weight of a mineral oil-based softening agent, and a step of kneading 100 parts by weight of the thermoplastic elastomer and 15 to 120 parts by weight of (C) an ethylene-based copolymer comprising unsaturated carboxylic acid units, thereby obtaining the thermoplastic elastomer composition.

Examples of such a method for producing a composite article include the following methods:

(1) a method comprising putting an article of a polyamide resin produced in advance into a mold, and then injecting a thermoplastic elastomer composition into the mold, thereby welding the article of the polyamide resin and an article of the thermoplastic elastomer composition together, (2) a method comprising bringing an article of a polyamide resin produced in advance into contact with an article of a thermoplastic elastomer composition produced in advance, and then mechanically bonding them by pressing by a press or the like, (3) a method comprising co-extruding a polyamide resin and a thermoplastic elastomer composition by using two extruders.

Neither the shape of the composite article to be produced by the method of the present invention nor the shape of the article of the thermoplastic elastomer composition that constitutes the composite article is particularly restricted. By the method of the present invention, automotive interior or exterior materials, industrial components, and tools, and so on can be produced.

EXAMPLES

The present invention is concretely described by the examples below, but the present invention is not limited to these examples.

[Measurement of Physical Properties]
<Evaluation of Article Made of Thermoplastic Elastomer Composition>
1. Hardness Durometer A hardness was measured in accordance with JIS K6253.

2. Tensile Strength and Elongation at Break

Tensile strength and elongation at break were measured in accordance with JIS K6251. Using a JIS No. 3 specimen, measurement was carried out at a tensile rate of 200 mm/min, and tensile strength and elongation exhibited when the specimen broken were measured.

3. Compression Set

Measurement was carried out in accordance with JIS K6262 under conditions including 70° C., 25% compression, and 22 hours.

4. Bleeding of Article

An article made of a thermoplastic elastomer composition was allowed to stand for one month at room temperature, and then the bleeding condition of the surface of the article was observed. If no bleeding is observed on the surface of an article, the appearance of the article is good.

o; No bleeding is observed on the surface of the article.

x; Bleeding is observed on the surface of the article.

<Evaluation of Composite Article>

5. Adhesion Strength

A specimen (150 mm×5 mm×4 mm in thickness) was obtained by cutting a composite article along its longitudinal direction at a width of 5 mm. The article of a thermoplastic elastomer composition and the article of a polyamide resin both constituting the specimen were delaminated at a tensile rate of 200 mm/min, and adhesion strength was evaluated.

[Material]

(1) Ethylene-α-olefin-Based Copolymerized Rubber (a) Ethylene-propylene-5-ethylidene-2-norbornene copolymer rubber: Mooney viscosity ($ML_{1+4}$ 100° C.): 250, ethylene unit content: 66% by weight, 5-ethylidene-2-norbornene unit content: 4.0% by weight (b) Ethylene-propylene-5-ethylidene-2-norbornene copolymer rubber: Mooney viscosity ($ML_{1+4}$ 100° C.): 141, ethylene unit content: 64% by weight, 5-ethylidene-2-norbornene unit content: 4.5% by weight (c) Ethylene-propylene-5-ethylidene-2-norbornene copolymer rubber: Mooney viscosity ($ML_{1+4}$ 100° C.): 92, ethylene unit content: 65% by weight, 5-ethylidene-2-norbornene unit content: 4.0% by weight (2) Mineral Oil-Based Softening Agent Commercial name: PW-380, produced by Idemitsu Kosan Co., Ltd.

(3) Oil-Extended Ethylene-α-Olefin-Based Copolymerized Rubber (R)

EPDM-1: Oil-extended rubber (Mooney viscosity ($ML_{1+4}$ 100° C.): 63) prepared by adding 100 parts by weight of the above-mentioned mineral oil-based softening agent to 100 parts by weight of the ethylene-propylene-5-ethylidene-2-norbornene copolymer rubber (a)

EPDM-2: Oil-extended rubber (Mooney viscosity ($ML_{1+4}$ 100° C.): 73) prepared by adding 40 parts by weight of the above-mentioned mineral oil-based softening agent to 100 parts by weight of the ethylene-propylene-5-ethylidene-2-norbornene copolymer rubber (b)

EPDM-3: Oil-extended rubber (Mooney viscosity ($ML_{1+4}$ 100° C.): 92) prepared by adding 100 parts by weight of the above-mentioned mineral oil-based softening agent to 100 parts by weight of the ethylene-propylene-5-ethylidene-2-norbornene copolymer rubber (c)

(4) Propylene-Based Resin (B)

PP-1: Propylene homopolymer (melt flow rate NIS K6758, 230° C., 21.18 N)=0.7 g/10 minutes)

(5) Ethylene-Based Copolymer (C)

EMAH-1: Ethylene-ethyl acrylate-maleic anhydride copolymer (melt flow rate (JIS K6758, 190° C., 21.18 N)=20 g/10 minutes, content of ethyl acrylate units: 19% by weight, content of maleic anhydride units: 2.8% by weight)

EMAH-2: Ethylene-ethyl acrylate-maleic anhydride copolymer (melt flow rate (JIS K6758, 190° C., 21.18 N)=3 g/10 minutes, content of ethyl acrylate units: 12.5% by weight, content of maleic anhydride units: 2.8% by weight)

Example 1

<Production of Thermoplastic Elastomer Composition>

A thermoplastic elastomer was obtained by extruding by the use of a twin screw extruder at 200±10° C. (i.e., dynamically vulcanizing) a mixture prepared by mixing 86% by weight of EPDM-1, 14% by weight of PP-1 (the total amount of EPDM-1 and PP-1 is taken as 100% by weight) and, per 100 parts by weight of the total amount of EPDM-1 and PP-1, 0.1 parts by weight of a phenol-type antioxidant (produced by Ciba Specialty Chemicals, commercial name: Irganox 1010) as an antioxidant, 0.2 parts by weight of a diazo-type weathering stabilizer (produced by Sumitomo Chemical Co., Ltd., commercial name: Sumisorb 300) as a weathering agent, 0.83 parts by weight of a crosslinking aid (produced by Seiko Chemical Co., Ltd., Hi-Cross M-P), and 3.2 parts by weight of an organic peroxide (produced by Kayaku Akzo Corporation, 2,5-dimethyl-2,5-di(tert-butylperoxy)hexane diluted to 10% with a paraffin-based oil PW-100 (produced by Idemitsu Kosan Co., Ltd.)).

A mixture was obtained by mixing 100 parts by weight of the thermoplastic elastomer obtained and 25 parts by weight of pellets of EMAH-1 with a tumbler mixer for 10 minutes. The mixture was pelletized with a 30-mm single screw extruder, affording a thermoplastic elastomer composition.

<Production of Article Made of Thermoplastic Elastomer Composition>

The thermoplastic elastomer composition was injection molded at a cylinder temperature of 220° C. and a mold temperature of 50° C. into a mold with the dimensions of 150 mm×90 mm×2 mm (thickness) by using a 100-ton injection molding machine, affording an article made of the thermoplastic elastomer composition. Evaluation results of the article are given in Table 1.

<Production of Composite Article>

A plate-like article of Nylon 6 (A1030BRL, produced by Unitika Ltd.) with the dimensions of 150 mm×90 mm×2 mm (thickness) was produced as an article made of a polyamide resin. The article was put into a mold with the dimensions of 150 mm×90 mm×4 mm (thickness). The thermoplastic elastomer composition was injected into the mold at a cylinder temperature of 220° C. and a mold temperature of 50° C. by using a 100-ton injection molding machine, so that a composite article composed of an article of the thermoplastic elastomer composition and the article of the polyamide resin welded together was obtained by insert molding method. Evaluation results of the composite article are given in Table 1.

Example 2

Operations were performed in the same manner as in Example 1 except for adjusting the amount of EMAH-1 to 42.8 parts by weight per 100 parts by weight of the thermoplastic elastomer. Evaluation results of an article made of the thermoplastic elastomer composition and evaluation results of a composite article composed of the article and an article of the polyamide resin welded together are given in Table 1.

Example 3

Operations were performed in the same manner as in Example 2 except for using EMAH-2 instead of EMAH-1. Evaluation results of an article made of the thermoplastic elastomer composition and evaluation results of a composite article composed of the article and an article of the polyamide resin welded together are given in Table 1.

Example 4

Operations were performed in the same manner as in Example 1 except for adjusting the amount of EMAH-1 to 100 parts by weight per 100 parts by weight of the thermoplastic elastomer. Evaluation results of an article made of the thermoplastic elastomer composition and evaluation results of a composite article composed of the article and an article of the polyamide resin welded together are given in Table 1.

Comparative Example 1

Operations were performed in the same manner as in Example 1 except for failing to mix EMAH-1 and failing to pelletize with a 30-mm single screw extruder. Evaluation results of an article made of the thermoplastic elastomer composition and evaluation results of a composite article composed of the article and an article of the polyamide resin welded together are given in Table 2.

Comparative Example 2

Operations were performed in the same manner as in Example 1 except for adjusting the amount of EMAH-1 to 11.1 parts by weight per 100 parts by weight of the thermoplastic elastomer. Evaluation results of an article made of the thermoplastic elastomer composition and evaluation results of a composite article composed of the article and an article of the polyamide resin welded together are given in Table 2.

Comparative Example 3

<Production of Thermoplastic Elastomer Composition>

A thermoplastic elastomer composition was obtained by extruding by the use of a twin screw extruder at 200±10° C. (i.e., dynamically vulcanizing) a mixture prepared by mixing 86% by weight of EPDM-1, 14% by weight of PP-1 (the total amount of EPDM-1 and PP-1 is taken as 100% by weight) and, per 100 parts by weight of the total amount of EPDM-1 and PP-1, 25 parts by weight of EMAH-1, 0.1 parts by weight of a phenol-type antioxidant (produced by Ciba Specialty Chemicals, commercial name: Irganox 1010) as an antioxidant, 0.2 parts by weight of a diazo-type weathering stabilizer (produced by Sumitomo Chemical Co., Ltd., commercial name: Sumisorb 300) as a weathering agent, 0.83 parts by weight of a crosslinking aid (produced by Seiko Chemical Co., Ltd., Hi-Cross M-P), and 3.2 parts by weight of an organic peroxide (produced by Kayaku Akzo Corporation, 2,5-dimethyl-2,5-di(tert-butylperoxy)hexane diluted to 10% with a paraffin-based oil PW-100 (produced by Idemitsu Kosan Co., Ltd.)).

<Production of Article Made of Thermoplastic Elastomer Composition>

The thermoplastic elastomer composition was injection molded at a cylinder temperature of 220° C. and a mold temperature of 50° C. into a mold with the dimensions of 150 mm×90 mm×2 mm (thickness) by using a 100-ton injection molding machine, affording an article made of the thermoplastic elastomer composition. Evaluation results of the article are given in Table 2.

<Production of Composite Article>

A plate-like article of A1030BRL produced by Unitika Ltd. with the dimensions of 150 mm×90 mm×2 mm (thickness) was produced as an article made of a polyamide resin. The article was put into a mold with the dimensions of 150 mm×90 mm×4 mm (thickness). The thermoplastic elastomer composition was injected into the mold at a cylinder temperature of 220° C. and a mold temperature of 50° C. by using a 100-ton injection molding machine, so that a composite article composed of an article of the thermoplastic elastomer composition and the article of the polyamide resin welded together was obtained by insert molding method. Evaluation results of the composite article are given in Table 2.

Comparative Example 4

Operations were performed in the same manner as in Comparative Example 3 except for adjusting the amount of EMAH-1 to 42.8 parts by weight. Evaluation results of an article made of the thermoplastic elastomer composition and evaluation results of a composite article composed of the article and an article of the polyamide resin welded together are given in Table 2.

Comparative Example 5

Operations were performed in the same manner as in Comparative Example 3 except for using EMAH-2 instead of EMAH-1. Evaluation results of an article made of the thermoplastic elastomer composition and evaluation results of a composite article composed of the article and an article of the polyamide resin welded together are given in Table 2.

Comparative Example 6

Operations were performed in the same manner as in Comparative Example 5 except for adjusting the amount of EMAH-2 to 42.8 parts by weight. Evaluation results of an article made of the thermoplastic elastomer composition and evaluation results of a composite article composed of the article and an article of the polyamide resin welded together are given in Table 2.

Comparative Example 7

<Production of Thermoplastic Elastomer Composition>

A thermoplastic elastomer was obtained by extruding by the use of a twin screw extruder at 200±10° C. (i.e., dynamically vulcanizing) a mixture prepared by mixing 81.4% by weight of EPDM-2, 18.6% by weight of PP-1 (the total amount of EPDM-2 and PP-1 is taken as 100% by weight) and, per 100 parts by weight of the total amount of EPDM-2 and PP-1, 32.6 parts by weight of a mineral oil-based softening agent, 0.08 parts by weight of a phenol-type antioxidant (produced by Ciba Specialty Chemicals, commercial name: Irganox 1010) as an antioxidant, 0.15 parts by weight of a diazo-type weathering stabilizer (produced by Sumitomo Chemical Co., Ltd., commercial name: Sumisorb 300) as a weathering agent, 0.63 parts by weight of a crosslinking aid (produced by Seiko Chemical Co., Ltd., Hi-Cross M-P), and 2.4 parts by weight of an organic peroxide (produced by Kayaku Akzo Corporation, 2,5-dimethyl-2,5-di(tert-butylperoxy)hexane diluted to 10% with a paraffin-based oil PW-100 (produced by Idemitsu Kosan Co., Ltd.)).

A mixture was obtained by mixing 100 parts by weight of the thermoplastic elastomer obtained and 42.8 parts by weight of pellets of EMAH-1 with a tumbler mixer for 10 minutes. The mixture was pelletized with a 30-mm single screw extruder, affording a thermoplastic elastomer composition.

<Production of Article of Thermoplastic Elastomer Composition>

The thermoplastic elastomer composition was injection molded at a cylinder temperature of 220° C. and a mold temperature of 50° C. into a mold with the dimensions of 150 mm×90 mm×2 mm (thickness)) by using a 100-ton injection molding machine, affording an article made of the thermoplastic elastomer composition. Evaluation results of the article are given in Table 2.

<Production of Composite Article>

A plate-like article of Nylon 6 (A1030BRL, produced by Unitika Ltd.) with the dimensions of 150 mm×90 mm×2 mm (thickness) was produced as an article made of a polyamide resin. The article was put into a mold with the dimensions of 150 mm×90 mm×4 mm (thickness). The thermoplastic elastomer composition was injected into the mold at a cylinder temperature of 220° C. and a mold temperature of 50° C. by using a 100-ton injection molding machine, so that a composite article composed of an article of the thermoplastic elastomer composition and the article of the polyamide resin welded together was obtained by insert molding method. Evaluation results of the composite article are given in Table 2.

Comparative Example 8

A thermoplastic elastomer was obtained by extruding by the use of a twin screw extruder at 200±10° C. (i.e., dynamically vulcanizing) a mixture prepared by mixing 75.4% by weight of EPDM-3, 24.6% by weight of PP-1 (the total amount of EPDM-3 and PP-1 is taken as 100% by weight) and, per 100 parts by weight of the total amount of EPDM-3 and PP-1, 75.4 parts by weight of a mineral oil-based softening agent, 0.06 parts by weight of a phenol-type antioxidant (produced by Ciba Specialty Chemicals, commercial name: Irganox 1010) as an antioxidant, 0.11 parts by weight of a diazo-type weathering stabilizer (produced by Sumitomo Chemical Co., Ltd., commercial name: Sumisorb 300) as a weathering agent, 0.47 parts by weight of a crosslinking aid (produced by Seiko Chemical Co., Ltd., Hi-Cross M-P), and 1.82 parts by weight of an organic peroxide (produced by Kayaku Akzo Corporation, 2,5-dimethyl-2,5-di(tert-butylperoxy)hexane diluted to 10% with a paraffin-based oil PW-100 (produced by Idemitsu Kosan Co., Ltd.)). A mixture was obtained by mixing 100 parts by weight of the thermoplastic elastomer obtained and 42.8 parts by weight of pellets of EMAH-1 with a tumbler mixer for 10 minutes. The mixture was pelletized with a 30-mm single screw extruder, affording a thermoplastic elastomer composition.

<Production of Article of Thermoplastic Elastomer Composition>

The thermoplastic elastomer composition was injection molded at a cylinder temperature of 220° C. and a mold temperature of 50° C. into a mold with the dimensions of 150 mm×90 mm×2 mm (thickness) by using a 100-ton injection molding machine, affording an article made of the thermoplastic elastomer composition. Evaluation results of the article are given in Table 2.

<Production of Composite Article>

A plate-like article of Nylon 6 (A1030BRL, produced by Unitika Ltd.) with the dimensions of 150 mm×90 mm×2 mm (thickness)) was produced as an article made of a polyamide resin. The article was put into a mold with the dimensions of 150 mm×90 mm×4 mm (thickness). The thermoplastic elastomer composition was injected into the mold at a cylinder temperature of 220° C. and a mold temperature of 50° C. by using a 100-ton injection molding machine, so that a composite article composed of an article of the thermoplastic elastomer composition and the article of the polyamide resin welded together was obtained by insert molding method. Evaluation results of the composite article are given in Table 2.

TABLE 1

| | Example | | | |
|---|---|---|---|---|
| | 1 | 2 | 3 | 4 |
| EPDM-1 | 86 | 86 | 86 | 86 |
| EPDM-2 | — | — | — | — |
| EPDM-3 | — | — | — | — |
| PP-1 | 14 | 14 | 14 | 14 |
| OIL | — | — | — | — |
| EMAH-1 | — | — | — | — |
| EMAH-2 | — | — | — | — |
| EMAH-1 | 25 | 42.8 | — | 100 |
| EMAH-2 | — | — | 42.8 | — |
| Hardness (Duro-A) | 71 | 72 | 79 | 75 |
| Tensile strength (MPa) | 4.0 | 3.8 | 4.9 | 4.0 |
| Elongation at break (%) | 440 | 440 | 390 | 420 |
| Compression set (%) | 56 | 67 | 63 | 84 |
| Adhesion strength (N/cm) | 13.3 | 24.7 | 28.6 | 47.3 |
| Bleeding of article | ◯ | ◯ | ◯ | ◯ |

TABLE 2

| | Comparative Example | | | | | | | |
|---|---|---|---|---|---|---|---|---|
| | 1 | 2 | 3 | 4 | 5 | 6 | 7 | 8 |
| EPDM-1 | 86 | 86 | 86 | 86 | 86 | 86 | — | — |
| EPDM-2 | — | — | — | — | — | — | 81.4 | — |
| EPDM-3 | — | — | — | — | — | — | — | 75.4 |
| PP-1 | 14 | 14 | 14 | 14 | 14 | 14 | 18.6 | 24.6 |
| OIL | — | — | — | — | — | — | 32.6 | 75.4 |
| EMAH-1 | — | — | 25 | 42.8 | — | — | — | — |
| EMAH-2 | — | — | — | — | 25 | 42.8 | — | — |
| EMAH-1 | — | 11.1 | — | — | — | — | 42.8 | 42.8 |
| EMAH-2 | — | — | — | — | — | — | — | — |
| Hardness (Duro-A) | 70 | 71 | 71 | 70 | 75 | 78 | 73 | 70 |
| Tensile strength (MPa) | 5.6 | 4.6 | 4.4 | 3.5 | 6.1 | 6.0 | 3.2 | 3.0 |
| Elongation at break (%) | 490 | 460 | 240 | 420 | 170 | 190 | 320 | 270 |
| Compression set (%) | 37 | 44 | 48 | 66 | 47 | 56 | 96 | 98 |
| Adhesion strength (N/cm) | 0 | 3.1 | 1.0 | 17.6 | 0.7 | 2.0 | 17.0 | 24.7 |
| Bleeding of article | ◯ | ◯ | x | x | x | x | ◯ | ◯ |

The invention claimed is:

1. A method for producing a thermoplastic elastomer composition, the method comprising
   a step of dynamically vulcanizing 50 to 90% by weight of (A) an oil-extended ethylene-α-olefin-based copolymerized rubber and 10 to 50% by weight of (B) a propylene-based resin, where the total amount of the oil-extended ethylene-α-olefin-based copolymerized rubber (A) and the propylene-based resin (B) is taken as 100% by weight, in the presence of a crosslinking agent, thereby obtaining a thermoplastic elastomer, wherein the oil-extended ethylene-α-olefin-based copolymerized rubber (A) comprises 100 parts by weight of an ethylene-α-olefin-based copolymer rubber having a Mooney viscosity ($ML_{1+4}100°$ C.) of 150 to 350 at 100° C. and 20 to 150 parts by weight of a mineral oil-based softening agent, and
   a step of kneading 100 parts by weight of the thermoplastic elastomer and 15 to 120 parts by weight of (C) an ethylene-based copolymer comprising ethylene units, unsaturated carboxylic acid units, and unsaturated ester compound units, thereby obtaining the thermoplastic elastomer composition.

2. The method according to claim 1, wherein the crosslinking agent is an organic peroxide.

3. The method according to claim 1, wherein the unsaturated carboxylic acid units are maleic anhydride units.

4. A method for producing a composite article, the method comprising a step of welding an article made of a polyamide resin and an article made of a thermoplastic elastomer composition together, wherein the thermoplastic elastomer composition is obtained by the method according to claim 1.

5. The method according to claim 1, wherein the unsaturated carboxylic acid units of ethylene-based copolymer (C) comprise unsaturated dicarboxylic acid anhydride units.

6. The method according to claim 1, wherein the ethylene-based copolymer (C) comprises 55 to 96% by weight of ethylene units, 3 to 37% by weight of unsaturated ester compound units, and 1 to 8% by weight of unsaturated dicarboxylic acid anhydride units where the weight of the ethylene-based copolymer (C) is taken as 100% by weight.

* * * * *